United States Patent
Prissok et al.

(10) Patent No.: US 10,907,021 B2
(45) Date of Patent: Feb. 2, 2021

(54) ISOCYANATE-EPOXY-FOAM SYSTEM

(71) Applicant: BASF SE, Ludwigshafen (DE)

(72) Inventors: Frank Prissok, Lemfoerde (DE); Andre Kamm, Bohmte (DE); Michael Harms, Diepholz (DE)

(73) Assignee: BASF SE, Ludwigshafen (DE)

( * ) Notice: Subject to any disclaimer, the term of this patent is extended or adjusted under 35 U.S.C. 154(b) by 554 days.

(21) Appl. No.: 14/908,079

(22) PCT Filed: Jul. 25, 2014

(86) PCT No.: PCT/EP2014/066044
§ 371 (c)(1),
(2) Date: Jan. 27, 2016

(87) PCT Pub. No.: WO2015/011269
PCT Pub. Date: Jan. 29, 2015

(65) Prior Publication Data
US 2016/0159999 A1 Jun. 9, 2016

(30) Foreign Application Priority Data
Jul. 26, 2013 (EP) .................................. 13178203

(51) Int. Cl.
| | | |
|---|---|---|
| *C08G 18/00* | (2006.01) | |
| *C08J 9/00* | (2006.01) | |
| *C08G 18/18* | (2006.01) | |
| *C08G 18/48* | (2006.01) | |
| *C08G 18/20* | (2006.01) | |
| *C08L 63/00* | (2006.01) | |
| *C08G 18/76* | (2006.01) | |
| *C08G 101/00* | (2006.01) | |
| *C08G 18/58* | (2006.01) | |

(52) U.S. Cl.
CPC .......... *C08J 9/0061* (2013.01); *C08G 18/003* (2013.01); *C08G 18/1816* (2013.01); *C08G 18/2027* (2013.01); *C08G 18/4812* (2013.01); *C08G 18/4829* (2013.01); *C08G 18/7664* (2013.01); *C08L 63/00* (2013.01); *C08G 18/58* (2013.01); *C08G 2101/005* (2013.01); *C08G 2101/0025* (2013.01); *C08G 2101/0058* (2013.01); *C08G 2101/0083* (2013.01); *C08J 2375/08* (2013.01); *C08J 2463/00* (2013.01)

(58) Field of Classification Search
CPC ....................... C08G 18/58–588; C08G 18/003
See application file for complete search history.

(56) References Cited

U.S. PATENT DOCUMENTS

| | | | | |
|---|---|---|---|---|
| 3,313,747 | A | * | 4/1967 | Schramm ............. C08G 18/003 521/117 |
| 4,699,931 | A | | 10/1987 | Fuzesi et al. |
| 5,162,387 | A | * | 11/1992 | Abel .................... C08G 18/003 252/182.23 |
| 5,530,035 | A | | 6/1996 | Ferrero-Heredia et al. |

FOREIGN PATENT DOCUMENTS

| | | |
|---|---|---|
| CN | 1126134 A | 7/1996 |
| DE | 26 01 927 A1 | 7/1976 |
| DE | 36 00 764 A1 | 7/1987 |
| EP | 0 130 454 A2 | 1/1985 |
| FR | 1441565 * | 4/1965 |
| FR | 1 441 565 A | 6/1966 |

OTHER PUBLICATIONS

Translation of FR 1441565 by Nicholas. (Year: 1965).*
Translation of DE2601927 by Seki. (Year: 1976).*
Tu, Y.; Fan, H.; Suppes, G.; Hsieh, F. "Physical Properties of Water-Blown Rigid Polyurethane Foams Containing Epoxidized Soybean Oil in Different Isocyanate Indices" Journal of Applied Polymer Science, vol. 114, 2577-2583 (Year: 2009).*
Translation of CN 103059242. (Year: 2013).*
Szycher, Michael , "Szycher's Handbook of Polyurethanes" (Boca Raton: CRC Press, Jul. 13, 2012 ), accessed Apr. 20, 2020 , Routledge Handbooks Online. (Year: 2012).*
"Polyurethane" Kunststoff-Handbuch, Band 7, Cad Hanser Verlag, Edited by Günter Oertel, 3rd edition, 1993, Section 3.1, pp. 57-75 and Cover Page.
"Polyurethane" Kunststoff-Handbuch, Band VII, Edited by Richard Viewed and August Höchtlen, Carl Hanser Verlag, 1966 pp. 103-113 and Cover Page.
International Search Report dated Oct. 14, 2014 in PCT/EP2014/066044 filed Jul. 25, 2014.

* cited by examiner

Primary Examiner — Michael M Dollinger
Assistant Examiner — Christina H. W. Rosebach
(74) Attorney, Agent, or Firm — Oblon, McClelland, Maier & Neustadt, L.L.P.

(57) ABSTRACT

The present invention relates to a method for producing a rigid foam, which comprises reacting at least one polyisocyanate with a mixture comprising at least one polyepoxide, water, and at least one other hydrogen-acidic compound, the reaction taking place in the presence of a metal-free Lewis base having at least one nitrogen atom, to rigid foams obtainable by such a method, and to the use of a rigid foam of the invention for producing insulating materials, vacuum insulation panels, refrigeration equipment, construction elements, wind rotor blades, or elements for boatbuilding and vehicle construction.

10 Claims, No Drawings

ISOCYANATE-EPOXY-FOAM SYSTEM

The present invention relates to a method for producing a rigid foam, which comprises reacting at least one polyisocyanate with a mixture comprising at least one polyepoxide, water, and at least one other hydrogen-acidic compound, the reaction taking place in the presence of a metal-free Lewis base having at least one nitrogen atom, to rigid foams obtainable by such a method, and to the use of a rigid foam of the invention for producing insulating materials, vacuum insulation panels, refrigeration equipment, construction elements, wind rotor blades, or elements for boatbuilding and vehicle construction.

Foams from isocyanates with hydrogen-acidic compounds such as alcohols or amines are long-known systems described in the literature. Mixing suitable compounds results in foams based on polyurethanes, polyureas, polyisocyanurates, or mixtures of these.

Epoxide foams are likewise known in the literature, but exhibit the disadvantage that low densities in the region of less than 150 g/l, of the kind customary for polyurethane foams, are not achieved, and the working time is very long in comparison to polyurethane foams, thus being, for example, greater than 1 hour for 10 mm thickness. The foams nevertheless display very good adhesion to epoxide outer layers, high stiffness, and good resistance properties.

A series of patents have addressed the production, processing, and utilization of combinations of isocyanates and epoxides. For industrial applications, the use of this class of substance is difficult, since simple mixtures of isocyanates and epoxides are very hard to react, even at elevated temperatures. The literature teaches that oxazolidones can be formed at higher temperatures, more particularly at temperatures above 120° C., after a relatively long time. A competing reaction is the formation of polyisocyanurates (PIR) from the isocyanates.

Accordingly, U.S. Pat. No. 4,699,931 describes a process for producing oxazolidone-modified polyisocyanurate foams, in which polyepoxides and polyisocyanates react with aminic PIR catalysts and blowing agents in order to produce corresponding foams. The disclosure of U.S. Pat. No. 4,699,931 is that the reaction proceeds extremely rapidly, with a starting time of less than 20 seconds, for example.

EP 0 130 454 A2 discloses a method for producing compact reactive resins based on isocyanates and epoxides. EP 0 130 454 A2 further teaches the use of amine catalysts as resulting in short pot lives even at low temperatures. A disadvantage possessed by the resin systems disclosed in EP 0 130 454 A2 is that they have to be cured at high temperatures.

DE 36 00 764 A1 describes the use of tertiary or quaternary ammonium salts as catalysts for obtaining systems with a long open time. A disadvantage associated with the method disclosed in DE 36 00 764 A1 is that the curing takes place at high temperatures. DE 36 00 764 A1 likewise discloses the ability to achieve an open time only of less than 20 minutes by means of tertiary amines. For relatively large components and industrial applications, these times and working conditions are insufficient.

A foam based on epoxides and isocyanates cannot be found accordingly in the literature.

Proceeding on the basis of the prior art, therefore, it was an object of the present invention to provide methods for producing rigid foams based on isocyanates and epoxides that are suitable for technical applications, and suitable rigid foam systems. The working time ought to be sufficiently long, and the rigid foams ought to have sufficient strength and good resistance at the same time.

In accordance with the invention this object is achieved by a method for producing a rigid foam, which comprises reacting at least one polyisocyanate with a mixture comprising at least one polyepoxide, water, and at least one other hydrogen-acidic compound, the reaction taking place in the presence of a metal-free Lewis base having at least one nitrogen atom.

The other hydrogen-acidic compound may in accordance with the invention be, in particular, polyols and polyamines. Accordingly, in a further embodiment, the present invention relates to a method for producing a rigid foam as described above, the at least one other hydrogen-acidic compound being selected from the group consisting of polyols and polyamines.

Surprisingly it has been found that in a rigid foam system, a large part of the hydrogen-acidic compound, more particularly the polyol component, can be replaced by an epoxide and with such a system, given appropriate catalysis, rigid foams are obtained which correspond, in their reaction characteristics and density, to water-blown polyurethane and/or urea foams.

Foams of this kind, as a new class of compound, offer the possibility for modifying conventional polyurethane and/or polyurea foams using epoxide compounds and, by virtue of an additional network, to introduce into the foams an increased strength, leading to an improvement in compressive strength, in temperature stability, and in chemical resistance. There is also a high compatibility between epoxy resins and foams of this kind.

In a further embodiment, the present invention further relates to a method for producing a rigid foam as described above, the method comprising at least the following steps:
(i) mixing the at least one polyisocyanate, the mixture comprising at least one polyepoxide, water, and at least one other hydrogen-acidic compound and the catalyst system to obtain a mixture (I);
(ii) delivering the mixture (I) into a mold or to the desired reaction site by pouring, spraying, or distributing;
(iii) heating the mixture (I) to a temperature in the range from 50 to 100° C. until the mixture is cured.

In accordance with the invention, the components of the mixture (I) are of low viscosity and are liquid at room temperature, i.e. the viscosity at 25° C. is less than 10 000 mPas.

Besides the at least one polyisocyanate, the mixture comprising at least one polyepoxide, water, and at least one other hydrogen-acidic compound and the catalyst system, the mixture (I) may comprise further components, examples being solvents, reactive diluents, stabilizers, thickeners, thixotropic agents, additives, adhesion promoters, fillers, and in particular, blowing agents.

According to one preferred embodiment, therefore, the present invention relates to a method for producing a rigid foam as described above, the mixture (I) comprising a blowing agent.

In step (ii), the resulting mixture (I) is delivered. For the purposes of the present invention, delivery may take place in any suitable way, particularly by pouring, spraying, or distributing. Suitable techniques are known per se to the skilled person.

Then, according to step (iii), there is a temperature treatment. In accordance with the invention, complete curing takes place only on heating, preferably on heating to a temperature of less than 100° C., more preferably on heating to a temperature in the range from 50 to 100° C. In accordance with the invention it is possible for the heating to take place by the heat of reaction that is given off during the exothermic reaction. It is also possible in accordance with the invention, however, for heating to take place by means of suitable techniques.

The present invention accordingly relates, in a further embodiment, to a method for producing a rigid foam as described above, the reaction starting at a temperature of less than 100° C.

In accordance with the invention, the heating takes place until the mixture cures. Curing of the mixture in this context means the attainment of at least 20%, preferably 50%, and more preferably 75% of the final hardness.

Heating may take place in any suitable way known to the skilled person—preferably by electrical, oil or water heating of the mold, induction arrays, hot air, or IR radiation onto the rigid foam surface.

The reaction of the at least one polyisocyanate and of the mixture comprising at least one polyepoxide, water, and at least one other hydrogen-acidic compound takes place in accordance with the invention in the presence of a metal-free Lewis base having at least one nitrogen atom as catalyst. This catalyst is used in a suitable amount so as to catalyze the reaction. The catalyst is used, for example, in an amount in the range from 0.0001 to 3 wt %.

In accordance with the invention the catalyst system is used preferably in an amount of 0.001 to 2 wt %, based on the sum of the polyisocyanate and the mixture comprising at least one polyepoxide, water, and at least one other hydrogen-acidic compound used. Preferably the catalyst system is used in an amount of 0.005 to 1.5 wt %, based on the sum of the polyisocyanate and of the mixture comprising at least one polyepoxide, water, and at least one other hydrogen-acidic compound used, more preferably in an amount of 0.01 to 1.0 wt %, based on the sum of the polyisocyanate and of the mixture comprising at least one polyepoxide, water, and at least one other hydrogen-acidic compound used.

The present invention accordingly, in a further embodiment, relates to a method for producing a rigid foam as described above, the catalyst being used in an amount in the range from 0.01 to 2 wt %, based on the sum of the polyisocyanate and of the mixture comprising at least one polyepoxide, water, and at least one other hydrogen-acidic compound used.

Used in accordance with the invention as catalyst is a metal-free Lewis base having at least one nitrogen atom. In accordance with the invention, the catalyst per se is not reacted. Suitable metal-free Lewis bases having at least one nitrogen atom are known per se to the skilled person. For example, the metal-free Lewis base may be a tertiary amine. Accordingly, in a further embodiment, the present invention relates to a method for producing a rigid foam as described above, the catalyst being a tertiary amine.

Preferred for use in the method of the invention is a catalyst system based on at least one metal-free Lewis base having at least one nitrogen atom, selected from the group consisting of 1,8-diazabicyclo-5,4,0-undecen-7-ene, N-methyl-N'-(dimethylaminomethyl)piperazine, pentamethyldiethylenetriamine, methylimidazole, and mixtures and derivatives thereof, more particularly selected from the group consisting of 1,8-diazabicyclo-5,4,0-undecen-7-ene and derivatives thereof.

Accordingly, in a further embodiment, the present invention relates to a method for producing a rigid foam as described above, the catalyst being selected from the group consisting of 1,8-diazabicyclo-5,4,0-undecen-7-ene, N-methyl-N'-(dimethylaminomethyl)piperazine, pentamethyldiethylenetriamine, methylimidazole, and mixtures and derivatives thereof. Further, in a further embodiment, the present invention relates to a method for producing a rigid foam as described above, the catalyst being selected from the group consisting of 1,8-diazabicyclo-5,4,0-undecen-7-ene and derivatives thereof.

The catalyst system preferably is a metal-free catalyst system—in other words, no further metal-containing catalyst is used. Accordingly, in a further embodiment, the present invention relates to a method for producing a rigid foam as described above, the catalyst system being a metal-free catalyst system.

With particular advantage for the purposes of the present invention, the metal-free Lewis base is a derivative of 1,8-diazabicyclo-5,4,0-undecen-7-ene, more preferably a blocked 1,8-diazabicyclo-5,4,0-undecen-7-ene, more preferably still a phenol-blocked 1,8-diazabicyclo-5,4,0-undecen-7-ene. For example, the metal-free Lewis base is a derivative of 1,8-diazabicyclo-5,4,0-undecen-7-ene or mixtures of 1,8-diazabicyclo-5,4,0-undecen-7-ene with acidic components, such as phenol or acids, for example. Products of this kind are marketed under a variety of trade names, such as, for example, Polycat SA 1/10, Toyocat DB 30, Toyocat DB 41, Toyocat DB 42, or Toyocat DB 60. Particular preference is given to using 1,8-diazabicyclo-5,4,0-undecen-7-ene or a phenol-blocked 1,8-diazabicyclo-5,4,0-undecen-7-ene.

In a further embodiment of the invention, it may be advantageous to add further tertiary amines as catalyst alongside the 1,8-diazacyclo-5,4,0-undecen-7-ene preferred for use in the invention. In that case preferably 1,8-diazacyclo-5,4,0-undecen-7-ene is present in excess. Preferred ratios of 1,8-diazacyclo-5,4,0-undecen-7-ene to other tertiary amines are in the proportion of 1:5 to 5:1, preferably 2:5 to 5:2.

The method of the invention uses a mixture comprising at least one polyepoxide, water, and at least one other hydrogen-acidic compound. The mixture ratio of the at least one polyepoxide and of the at least one other hydrogen-acidic compound here may vary within wide ranges, as long as it is ensured that a foam is formed in the reaction of the mixture with the at least one polyisocyanate. The polyepoxide is used here in accordance with the invention, for example, in an amount in the range from 5 to 70 wt %, based on the sum of the polyepoxide and of the at least one other hydrogen-acidic compound used, preferably in an amount in the range from 10 to 60 wt %, based on the sum of the polyepoxide and of the at least one other hydrogen-acidic compound used, more preferably in the range from 20 to 60 wt %, based on the sum of the polyepoxide and of the at least one other hydrogen-acidic compound used.

In accordance with a further embodiment, therefore, the present invention relates to a method for producing a rigid foam as described above, the polyepoxide being used in an amount in the range from 5 to 70 wt %, based on the sum of the polyepoxide and of the at least one other hydrogen-acidic compound used.

In accordance with the invention a mixture is used which comprises at least one polyepoxide, water, and at least one other hydrogen-acidic compound. In accordance with the invention this mixture comprises customarily up to 5 wt % of water, based on the sum of the polyepoxide, the water, and the at least one other hydrogen-acidic compound used, preferably in an amount in the range from 0.2 to 4.0 wt %, based on the sum of the polyepoxide, the water, and the at least one other hydrogen-acidic compound used, more preferably in the range from 1.0 to 2.5 wt %, based on the sum of the polyepoxide, the water, and the at least one other hydrogen-acidic compound used.

The at least one other hydrogen-acidic compound for the purposes of the present invention is preferably selected from the group consisting of polyols and polyamines. Polyols and polyamines that are suitable are known in principle to the skilled person. Suitable polyols are described, for example, in "Kunststoffhandbuch, volume 7, Polyurethane", Carl Hanser Verlag, 3rd edition 1993, section 3.1. With particular preference for the purposes of the present invention, the hydrogen-acidic compound is selected from the group consisting of polyether polyols, polyester polyols, polycarbonate polyols, and polyamines.

According to a further embodiment, therefore, the present invention relates to a method for producing a rigid foam as described above, the at least one other hydrogen-acidic compound being selected from the group consisting of polyether polyols, polyester polyols, polycarbonate polyols, or polyamines.

The polyepoxides which are used for the purposes of the present invention may be any desired compounds. These polyepoxides comprise at least one epoxide group, but preferably two or more epoxide groups. Suitable polyepoxides are known to the skilled person from the literature, such as from the Handbook of Epoxy Resins (H. Lee, K. Neville, McGraw-Hill Book Company), for example. Examples that may be given of monofunctional epoxides are isopropyl glycidyl ether, tert-butyl glycidyl ether or ethylhexyl glycidyl ether, for example. Having proven particularly suitable for the method of the invention are epoxides based on epichlorohydrin and bisphenol A, bisphenol F, bisphenol K, bisphenol S, biphenol, hydroquinone, resorcinol, tetrabromobisphenol A, phenol-formaldehyde novolac resins, polyglycidyl ethers, diglycidyl esters of, for example, phthalic acids or terephthalic acids, and derivatives thereof, and aliphatic di- or tri-epoxides, and mixtures thereof. Products of this kind are marketed by a variety of manufacturers, under the trade names Araldite©, D.E.R.©, Epilox©, or Baxxores©. Particularly preferred are bisphenol A epoxides and derivatives thereof, especially glycidyl ethers, such as diglycidyl ether of bisphenol A, for example, and mixtures with the above-stated aliphatic di- or tri-epoxides.

In a further embodiment, accordingly, the present invention relates to a method for producing a rigid foam as described above, the at least one polyepoxide being selected from the group consisting of bisphenol A epoxides, bisphenol F epoxides, derivatives thereof, aliphatic di- or tri-epoxides, and mixtures of two or more thereof.

In accordance with the invention it is also possible to use mixtures of different polyepoxides.

In accordance with the invention, the polyepoxide can be used in pure form or in the form of a composition comprising the polyepoxide and at least one diluent. Examples of suitable diluents known to the skilled person are unreactive solvents such as ethyl acetate, methyl ethyl ketone, hydrocarbons, reactive diluents such as linear di- or tri-epoxides of low viscosity, plasticizers such as phthalates, or citric esters. The following ought also to be understood as diluents for the purposes of this invention: low-viscosity reactive diluents such as, for example, monoglycidyl ethers or diglycidyl ethers based on short-chain diols or triols, such as 1,4-butanediol, 1,6-hexanediol, trimethylolpropane, 1,4-cyclohexanedimethanol, or polyoxypropylene glycol, for example.

As polyisocyanates it is possible to use aliphatic, cycloaliphatic, araliphatic and/or aromatic diisocyanates. Specific examples include the following aromatic isocyanates: 2,4-tolylene diisocyanate, mixtures of 2,4- and 2,6-tolylene diisocyanate, 4,4'-, 2,4'- and/or 2,2'-diphenylmethane diisocyanate (MDI), mixtures of 2,4'- and 4,4'-diphenylmethane diisocyanate, urethane-modified liquid 4,4'- and/or 2,4-diphenylmethane diisocyanates, 4,4'-diisocyanatodiphenylethane, the mixtures of monomeric methanediphenyl diisocyanates and more highly polycyclic homologs of methanediphenyl diisocyanate (polymeric MDI), 1,2- and 1,5-naphthylene diisocyanate.

Aliphatic diisocyanates used are customary aliphatic and/or cycloaliphatic diisocyanates, examples being tri-, tetra-, penta-, hexa-, hepta- and/or octamethylene diisocyanate, 2-methylpentamethylene 1,5-diisocyanate, 2-ethylbutylene 1,4-diisocyanate, 1-isocyanato-3,3,5-trimethyl-5-isocyanatomethylcyclohexane (isophorone diisocyanate, IPDI), 1,4- and/or 1,3-bis(isocyanatomethyl)cyclohexane (HXDI), 1,4-cyclohexane diisocyanate, 1-methyl-2,4- and/or -2,6-cyclohexane diisocyanate, 4,4'-, 2,4'- and/or 2,2'-dicyclohexylmethane diisocyanate.

Polyisocyanate prepolymers are obtainable by reacting above-described polyisocyanates in excess, at temperatures of 30 to 100° C., for example, preferably at about 80° C., with polyols to give the prepolymer. For the preparation of the prepolymers useful in the invention, preference is given to using polyisocyanates and commercial polyols based on polyesters, starting for example from adipic acid, or on polyethers, starting for example from ethylene oxide and/or propylene oxide.

Polyols are known to the skilled person and are described for example in "Kunststoffhandbuch, volume 7, Polyurethane", Carl Hanser Verlag, 3rd edition 1993, section 3.1. Polyols used with preference in this context are the polymeric compounds described above, having hydrogen atoms that are reactive toward isocyanates. Particularly preferred for use as polyols are polyetherols.

In the preparation of the isocyanate prepolymers, customary chain extenders or crosslinking agents are added optionally to the stated polyols. Such substances are known per se to the skilled person. Particularly preferred for use as chain extender is 1,4-butanediol, dipropylene glycol and/or tripropylene glycol. In this case the ratio of organic polyisocyanates to polyols and chain extenders is preferably selected such that the isocyanate prepolymer has an NCO content of 2% to 30%, preferably of 6% to 28%, more preferably of 10% to 24%.

Particularly preferred polyisocyanates are selected from the group consisting of MDI, polymeric MDI, and TDI, and also derivatives thereof or prepolymers of these polyisocyanates.

In a further embodiment, accordingly, the present invention relates to a method for producing a rigid foam as described above, the at least one polyisocyanate being selected from the group consisting of aromatic, araliphatic, and aliphatic polyisocyanates. According to another embodiment, the present invention relates to a method for producing a rigid foam as described above, the at least one polyisocyanate being a prepolymer having an NCO content of 6% to 30%.

In accordance with the invention, the polyisocyanate can be used in pure form or in the form of a composition, for example, an isocyanate prepolymer. In a further embodiment, a mixture can be used which comprises polyisocyanate and at least one solvent or diluent. Suitable solvents are known to the skilled person.

The ratio in the reaction of polyisocyanates and the mixture comprising at least one polyepoxide, water, and at least one other hydrogen-acidic compound ought preferably to be situated for an equivalents ratio of polyisocyanate to the mixture comprising polyepoxide, water, and at least one other hydrogen-acidic compound in the range from, for example, 0.25:1 to 5000:1, more preferably 0.35:1 to 500:1, very preferably 0.5:1 to 100:1, and more particularly 0.75:1 to 50:1, with further preference in the range from 0.8:1 to 5:1.

In accordance with the invention it is possible to add customary auxiliaries. Examples that may be mentioned include blowing agents, surface-active substances, fillers, further flame retardants, nucleators, oxidation stabilizers, lubricity aids and mold release aids, dyes and pigments, optionally stabilizers, with respect to hydrolysis, light, heat, or discoloration, for example, inorganic and/or organic fillers, reinforcing agents, and plasticizers. Suitable auxiliaries and adjuvants may be found, for example, in Kunststoffhandbuch, volume VII, edited by Vieweg and Höchtlen, Carl Hanser Verlag, Munich 1966 (pp. 103-113).

Surprisingly it has been found that humid storage of the cured rigid foam leads to a further improvement in the mechanical properties. This effect may be achieved in a water vapor atmosphere even on relatively short storage. On storage in water (saltwater, mains water, desalinated water) as well this effect can be observed at elevated temperatures (>50° C.).

In accordance with a further embodiment, then, the present invention relates to a method for producing a rigid foam as described above, the fully reacted rigid foam obtained in the reaction being stored under humid conditions after the reaction.

The present invention also relates to the use of a metal-free Lewis base having at least one nitrogen atom as catalyst for the reaction of at least one polyisocyanate with a mixture comprising at least one polyepoxide, water, and at least one other hydrogen-acidic compound.

More particularly the present invention relates to the use of 1,8-diazabicyclo-5,4,0-undecen-7-ene and derivatives thereof as catalyst for the reaction of at least one polyisocyanate with at least one polyepoxide, more preferably to the use of 1,8-diazabicyclo-5,4,0-undecen-7-ene and derivatives thereof as catalyst for the reaction of bisphenol A epoxides and derivatives thereof with at least one polyisocyanate.

The present invention further relates as well to rigid foams obtainable or obtained by a method of the invention and also to moldings obtainable from such rigid foams.

Also, then, the present invention relates to a rigid foam obtainable or obtained by a method comprising reacting at least one polyisocyanate with a mixture comprising at least one polyepoxide, water, and at least one other hydrogen-acidic compound, the reaction taking place in the presence of a metal-free Lewis base having at least one nitrogen atom.

Suitable hydrogen-acidic compounds, polyepoxides, polyisocyanates, and catalyst system have been described above.

Hence, according to another embodiment, the present invention relates to a rigid foam as described above, the polyepoxide being used in an amount in the range from 5 to 70 wt %, based on the sum of the polyepoxide and of the at least one other hydrogen-acidic compound used.

According to a further embodiment, prepolymers are used as polyisocyanates. By varying the isocyanate fraction in the prepolymer it is possible to set additional properties such as hardness, for example, if no further adjuvants such as plasticizers, for example, are used.

Thus, in a further embodiment, the present invention relates to a rigid foam as described above, the at least one polyisocyanate being selected from the group consisting of bisphenol A epoxides, bisphenol F epoxides, derivatives thereof, aliphatic di- or tri-epoxides, and mixtures of two or more thereof.

Moreover, in a further embodiment, the present invention relates to a rigid foam as described above, the at least one polyisocyanate being selected from the group consisting of aromatic, araliphatic, and aliphatic polyisocyanates.

In terms of morphological properties such as closed-cell content and thermal conductivity, no difference and no impairment relative to comparative foams without epoxide have been found; certain mechanical properties of the foams of the invention are similar to those of comparable foams without addition of epoxides, while others undergo significant improvement, such as compressive strength and 3-point bending strength, for example, and also tensile strength.

The rigid foams of the invention exhibit high temperature stability, high resistance to environmental influences and chemicals, and good adhesion and compatibility with epoxy resins.

Besides the customary applications for rigid, semirigid, and thermoset polyurethane foam, such as insulation, district heating, sandwich elements, construction applications, foot traffic noise reduction, refrigeration equipment, truck bodies, and construction materials, suitable fields of use for the foams of the invention include their use in wind rotor blades, in boatbuilding and vehicle construction, and also their application as a construction material, especially in conjunction with the use of epoxy resins or polyester resins.

Accordingly, the present invention also relates to the use of a rigid foam obtainable or obtained by a method of the invention, or of a rigid foam of the invention, for producing insulating materials, vacuum insulation panels, refrigeration equipment, construction elements, wind rotor blades, or elements for boatbuilding and vehicle construction.

Further embodiments of the present invention are apparent from the claims and the examples. It is understood that the features of the subject matter/method/uses of the invention, as elucidated below and as stated above, can be used not only in the particular combination specified but also in other combinations as well, without departing the scope of the invention. Accordingly, for example, the combination of a preferred feature with a more preferred feature, or of an otherwise uncharacterized feature with a very preferred feature, etc., is also implicitly comprised, even if that combination is not expressly mentioned.

Listed below are exemplary embodiments of the present invention, which do not restrict the present invention. In particular, the present invention also encompasses embodiments which arise from the dependency references stated below, and hence combinations.

1. A method for producing a rigid foam, which comprises reacting at least one polyisocyanate with a mixture comprising at least one polyepoxide, water, and at least one other hydrogen-acidic compound, the reaction taking place in the presence of a metal-free Lewis base having at least one nitrogen atom.

2. The method according to embodiment 1, the at least one other hydrogen-acidic compound being selected from the group consisting of polyols and polyamines.

3. The method according to either of embodiments 1 and 2, the polyepoxide being used in an amount in the range from 5 to 70 wt %, based on the sum of the polyepoxide and the at least one other hydrogen-acidic compound used.

4. The method according to any of embodiments 1 to 3, the catalyst being a tertiary amine.

5. The method according to any of embodiments 1 to 4, the catalyst being selected from the group consisting of 1,8-diazabicyclo-5,4,0-undecen-7-ene, N-methyl-N'-(dimethylamino-methyl)piperazine, pentamethyldiethylenetriamine, methylimidazole, and mixtures and derivatives thereof.

6. The method according to any of embodiments 1 to 5, the catalyst being used in an amount in the range from 0.01 to 2 wt %, based on the sum of the polyisocyanate and of the mixture comprising at least one polyepoxide, water, and at least one other hydrogen-acidic compound used.

7. The method according to any of embodiments 1 to 6, the reaction of the at least one polyisocyanate with a mixture comprising at least one polyepoxide, water, and at least one other hydrogen-acidic compound being started at a temperature of <100° C.

8. The method according to any of embodiments 1 to 7, the at least one other hydrogen-acidic compound being selected from the group consisting of polyether polyols, polyester polyols, polycarbonate polyols, or polyamines.

9. The method according to any of embodiments 1 to 8, the at least one polyepoxide being selected from the group consisting of bisphenol A epoxides, bisphenol F epoxides, derivatives thereof, aliphatic di- or tri-epoxides, and mixtures of two or more thereof.

10. The method according to any of embodiments 1 to 9, the at least one polyisocyanate being selected from the group consisting of aromatic, araliphatic, and aliphatic polyisocyanates.

11. The method according to any of embodiments 1 to 9, the at least one polyisocyanate being a prepolymer having an NCO content of 6% to 30%.

12. A rigid foam obtainable or obtained by a method comprising reacting at least one polyisocyanate with a mixture comprising at least one polyepoxide, water, and at least one other hydrogen-acidic compound, the reaction taking place in the presence of a metal-free Lewis base having at least one nitrogen atom.

13. The rigid foam according to embodiment 12, the polyepoxide being used in an amount in the range from 5 to 70 wt %, based on the sum of the polyepoxide and the at least one other hydrogen-acidic compound used.

14. The rigid foam according to embodiment 12 or 13, the at least one polyepoxide being selected from the group consisting of bisphenol A epoxides, bisphenol F epoxides, derivatives thereof, aliphatic di- or tri-epoxides, and mixtures of two or more thereof.

15. The rigid foam according to any of embodiments 12 to 14, the at least one polyisocyanate being selected from the group consisting of aromatic, araliphatic, and aliphatic polyisocyanates.

16. The use of a rigid foam obtainable or obtained by a method according to any of embodiments 1 to 11, or of a rigid foam according to any of claims 12 to 15, for producing insulating materials, vacuum insulation panels, refrigeration equipment, construction elements, wind rotor blades, or elements for boatbuilding and vehicle construction.

17. The method according to any of embodiments 1 to 4, the catalyst being selected from the group consisting of 1,8-diazabicyclo-5,4,0-undecen-7-ene and derivatives thereof.

The examples which follow are for illustration of the invention, but are not in any way restricting as regards the subject matter of the present invention.

EXAMPLES

Starting materials used were as follows:
Polyol 1 Glycerol started polypropylene glycol with an average molecular weight (MW) of 420 g/mol and a functionality of about 2.99
Polyol 2 Sucrose/glycerol started polypropylene glycol with an average molecular weight (MW) of 500 g/mol and a functionality of about 4.34
Polyol 3 TMP started polypropylene glycol with an average molecular weight (MW) of 1040 g/mol and a functionality of about 2.96
Polyol 4 Propylene glycol started polypropylene glycol with an average molecular weight (MW) of 1070 g/mol and a functionality of about 1.99
Stabi 1 Polyether-polydimethylsiloxane
Stabi 2 Silicone-glycol copolymer
Epoxide Epoxide mixture based on bisphenol A epoxides and reactive diluents
Cat 1 N,N-Dimethylcyclohexylamine
Cat 2 1-Methylimidazole
Cat 3 N-Methyl-N-(dimethylaminomethyl)piperazine
Cat 4 Pentamethyldiethylenetriamine
Cat 5 1,8-Diazabicyclo-5,4,0-undecen-7-ene
Isocyanate Polymeric MDI with a 31.5% NCO content 1. Preparation Example The formula constituents were weighed out together in accordance with the proportions in table 1, except for the isocyanate, and this mixture was homogenized. 238.1 g of this A component were stirred intensively with 301.9 g of isocyanate for 10 seconds with a laboratory bench top mixer. This batch was subsequently poured into an 11 l metal mold, which was sealed with a lid. After a curing time of more than 5 minutes, the foam cube is demoldable, with an edge length of 22.2×22.2×22.2 cm.

An exception is represented by example 4. This cube, 13 minutes after introduction into the mold, was placed in a heating cabinet at 90° C. and left in the cabinet to aftercure for 16 hours.

Comparative examples are labeled "Comp".

TABLE 1

| Composition | | | | | | |
| --- | --- | --- | --- | --- | --- | --- |
| Substance | Comp 1 | Ex 1 | Ex 2 | Ex 3 | Ex 4 | Ex 5 |
| Polyol 1 | 7.48 | 6.95 | 6.10 | 5.16 | 5.16 | 4.65 |
| Polyol 2 | 22.86 | 21.27 | 18.67 | 15.77 | 15.77 | 14.23 |
| Polyol 3 | 2.20 | 2.05 | 1.80 | 1.52 | 1.52 | 1.37 |
| Polyol 4 | 6.64 | 6.18 | 5.43 | 4.58 | 4.58 | 4.14 |
| Mains water | 1.45 | 1.35 | 1.19 | 1.00 | 1.00 | 0.90 |
| Stabi 1 | 0.46 | 0.42 | 0.37 | 0.32 | 0.32 | 0.28 |
| Stabi 2 | 0.17 | 0.15 | 0.14 | 0.11 | 0.11 | 0.10 |
| Epoxide | 0.00 | 3.86 | 10.17 | 17.19 | 17.19 | 15.51 |
| Cat 1 | 0.19 | 0.17 | 0.15 | 0.13 | 0.13 | 0.12 |
| Cat 2 | 0.08 | 0.08 | 0.07 | 0.06 | 0.06 | 0.05 |
| Cat 3 | 0.00 | 0.01 | 0.01 | 0.02 | 0.02 | 0.02 |
| Cat 4 | 0.00 | 0.00 | 0.01 | 0.01 | 0.01 | 0.01 |
| Cat 5 | 0.00 | 0.00 | 0.00 | 0.00 | 0.00 | 0.00 |
| Isocyanate | 58.47 | 57.49 | 55.90 | 54.12 | 54.12 | 58.60 |
| Substance | Ex 6 | Ex 7 | Ex 8 | Ex 9 | Ex 10 | Comp 2 |
| Polyol 1 | 6.06 | 6.10 | 5.54 | 5.53 | 6.09 | 6.09 |
| Polyol 2 | 18.52 | 18.66 | 16.94 | 16.92 | 18.61 | 18.62 |

TABLE 1-continued

| Composition | | | | | | |
|---|---|---|---|---|---|---|
| Polyol 3 | 1.78 | 1.80 | 1.63 | 1.63 | 1.79 | 1.79 |
| Polyol 4 | 5.38 | 5.42 | 4.92 | 4.92 | 5.41 | 5.41 |
| Mains water | 1.18 | 1.19 | 1.08 | 1.08 | 1.18 | 1.18 |
| Stabi 1 | 0.37 | 0.37 | 0.34 | 0.34 | 0.37 | 0.37 |
| Stabi 2 | 0.13 | 0.14 | 0.12 | 0.12 | 0.14 | 0.14 |
| Epoxide | 10.09 | 10.17 | 13.23 | 13.21 | 10.14 | 10.14 |
| Cat 1 | 0.15 | 0.15 | 0.00 | 0.20 | 0.15 | 0.00 |
| Cat 2 | 0.07 | 0.07 | 0.10 | 0.00 | 0.07 | 0.00 |
| Cat 3 | 0.02 | 0.00 | 0.08 | 0.09 | 0.08 | 0.00 |
| Cat 4 | 0.01 | 0.00 | 0.04 | 0.04 | 0.04 | 0.00 |
| Cat 5 | 0.36 | 0.02 | 0.00 | 0.00 | 0.00 | 0.00 |
| Isocyanate | 55.89 | 55.91 | 55.99 | 55.93 | 55.93 | 55.75 |

2. Properties of the Foams

The physical properties of all the rigid foam cubes produced were tested, as listed in table 2.

TABLE 2

| Properties | | | | | | |
|---|---|---|---|---|---|---|
|  | Comp 1 | Ex 1 | Ex 2 | Ex 3 | Ex 4 | Ex 5 |
| Compressive strength | 0.26 | 0.264 | 0.28 | 0.306 | 0.31 | 0.345 |
| Compression | 5.3 | 5.4 | 4.9 | 4.6 | 5.4 | 5 |
| Compressive elasticity modulus | 7.95 | 7.98 | 9.27 | 10.27 | 9.44 | 10.39 |
| Core density | 37.8 | 39.2 | 44.3 | 50.1 | 45.8 | 55.2 |
| Closed-cell content | 87 | 87 | 86 | 85 | 85 | 86 |
| Tensile strength | 0.33 | 0.31 | 0.34 | 0.32 | 0.35 | 0.38 |
| Fracture location | S, S, S | S, S, S | S, S, S | S, S, S | S, S, S | S, S, S |
| Tensile elasticity modulus | 17.1 | 15.5 | 16 | 14.8 | 17.3 | 18.6 |
| Point flexural strength | 0.27 | 0.26 | 0.27 | 0.32 | 0.32 | 0.35 |
| Sag | 13.5 | 14.8 | 12.5 | 11.2 | 12.3 | 11.3 |
| Flame height B2 | >25.0 | >25.0 | >25.0 | >25.0 | >25.0 | >25.0 |
| Thermal conductivity | 25.5 | 25 | 26 | 25.9 | 26.6 | 26.1 |
|  | Ex 6 | Ex 7 | Ex 8 | Ex 9 | Ex 10 | Comp 2 |
| Compressive strength | 0.307 | 0.29 | 0.293 | 0.345 | 0.305 | None |
| Compression | 4.8 | 4.6 | 4.5 | 4.3 | 5.5 | Through-curing |
| Compressive elasticity modulus | 10.48 | 10.19 | 10.57 | 12.24 | 10.83 | — |
| Core density | 47.3 | 46.9 | 48.5 | 49.3 | 46.9 | — |
| Closed-cell content | 88 | 89 | 87 | 90 | 89 | — |
| tensile strength | 0.34 | 0.31 | 0.24 | 0.35 | 0.34 | — |
| Fracture location | S, S, S | S, S, S | S, S, S | S, S, S | S, S, S | — |
| Tensile elasticity modulus | 13.3 | 12.5 | 9 | 16 | 13.3 | — |
| Point flexural strength | 0.42 | 0.43 | 0.43 | 0.42 | 0.37 | — |
| Sag | 14.1 | 12.9 | 10.4 | 9.6 | 14.4 | — |
| Flame height B2 | >18.0 | >18.0 | <18.0 | >18.0 | >18.0 | — |
| Thermal conductivity | 23.6 | 23.6 | 23.9 | 24 | 23.2 | — |

The foams of the invention exhibit advantages in compressive strength, the compressive elasticity modulus, and the point flexural strength.

3. Test Protocols

The properties of the specimens were determined in accordance with the following test protocols:

Compressive strength in N/mm$^2$ in accordance with DIN 53421/DIN EN ISO 604

Compression in % in accordance with DIN 53421/DIN EN ISO 604

Compressive elasticity modulus in N/mm$^2$ in accordance with DIN 53421/DIN EN ISO 604

Core density in kg/m$^3$

Closed cell content in % in accordance with DIN ISO 4590

Tensile strength in N/mm$^2$ in accordance with DIN 53292/DIN EN ISO 527-1

Fracture location in accordance with DIN 53292/DIN EN ISO 527-1

Tensile elasticity modulus in N/mm$^2$ in accordance with DIN 53292/DIN EN ISO 527-1

3-Point flexural strength in N/mm$^2$ in accordance with DIN 53423

Sag in mm in accordance with DIN 53423

Flame height in cm in accordance with DIN 4102 B2

Thermal conductivity in mW/mK in accordance with Hesto A50

The invention claimed is:

1. A method for producing a rigid foam, the method comprising:

reacting at least one polyisocyanate with a mixture comprising at least one polyepoxide, water, and at least one other hydrogen-acidic compound, the reaction taking place in the presence of a catalyst, which is a metal-free Lewis base comprising at least one nitrogen atom, wherein the catalyst is selected from the group consisting of 1,8-diazabicyclo-5,4,0-undecen-7-ene, N-methyl-N'-(dimethylaminomethyl)piperazine, pentamethyldiethylenetriamine, methylimidazole, and a mixture and a derivative thereof, wherein the at least one polyepoxide is selected from the group consisting of a bisphenol A epoxide, a bisphenol F epoxide, a derivative thereof, an aliphatic di-epoxide, an aliphatic tri-epoxide, and a mixture of two or more thereof, and wherein the at least one polyepoxide is used in an amount in a range from 10.17 to 17.19 wt %, based on a sum of the polyisocyanate and of the mixture comprising the at least one polyepoxide, water, and the at least one other hydrogen-acidic compound used.

2. The method according to claim 1, wherein the at least one other hydrogen-acidic compound is selected from the group consisting of a polyol and a polyamine.

3. The method according to claim 1, wherein the at least one other hydrogen-acidic compound is selected from the group consisting of a polyether polyol, a polyester polyol, a polycarbonate polyol, and a polyamine.

4. The method according to claim 1, wherein the at least one other hydrogen-acidic compound is selected from the group consisting of a polyester polyol, a polycarbonate polyol, and a polyamine.

5. The method according to claim 1, wherein the at least one other hydrogen-acidic compound is a polycarbonate polyol.

6. The method according to claim 1, wherein the catalyst is selected from the group consisting of 1,8-diazabicyclo-5,4,0-undecen-7-ene, and a derivative thereof.

7. The method according to claim 1, wherein the catalyst is used in an amount in a range from 0.01 to 2 wt %, based on a sum of the polyisocyanate and of the mixture comprising the at least one polyepoxide, water, and the at least one other hydrogen-acidic compound used.

8. The method according to claim 1, wherein the reacting starts at a temperature of <100° C.

9. The method according to claim 1, wherein the at least one polyisocyanate is selected from the group consisting of an aromatic polyisocyanate, an araliphatic polyisocyanate, and an aliphatic polyisocyanate.

10. The method according to claim 1, wherein the at least one polyisocyanate is a prepolymer having an NCO content of 6% to 30%.

* * * * *